US012495351B2

(12) United States Patent
Chitta et al.

(10) Patent No.: US 12,495,351 B2
(45) Date of Patent: Dec. 9, 2025

(54) FACILITATING RADIO ACCESS NETWORK INTEGRATION WITH DATA CENTERS

(71) Applicant: Cisco Technology, Inc., San Jose, CA (US)

(72) Inventors: Nithin Chitta, Bangalore (IN); Somaraju Kaki, Karnataka (IN); Darin A. Kaufman, Lenexa, KS (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 299 days.

(21) Appl. No.: 18/330,570

(22) Filed: Jun. 7, 2023

(65) Prior Publication Data

US 2024/0414627 A1    Dec. 12, 2024

(51) Int. Cl.
| | | |
|---|---|---|
| H04W 40/24 | (2009.01) | |
| H04L 41/12 | (2022.01) | |
| H04L 43/0852 | (2022.01) | |

(52) U.S. Cl.
CPC .......... *H04W 40/246* (2013.01); *H04L 41/12* (2013.01); *H04L 43/0852* (2013.01)

(58) Field of Classification Search
CPC ... H04W 40/246; H04L 41/12; H04L 43/0852
See application file for complete search history.

(56) References Cited

U.S. PATENT DOCUMENTS 9,197,709 B2 * 11/2015 Caputo, II .......... H04L 12/1421
2007/0077925 A1 * 4/2007 Hiyama .................. H04M 1/66
455/414.1

(Continued)

FOREIGN PATENT DOCUMENTS

CN    118075760 A  *  5/2024   ........... H04B 17/382
EP    1928154 A1  *  6/2008   ......... H04L 65/1016
(Continued)

OTHER PUBLICATIONS

Batyr Charyyev, et al., "Latency Comparison of Cloud Datacenters and Edge Servers," IEEE, IEEE Global Communications Conference, Dec. 2020, 6 pages.

(Continued)

*Primary Examiner* — Shean Tokuta
(74) *Attorney, Agent, or Firm* — Edell, Shapiro & Finnan, LLC

(57) ABSTRACT

A method, computer system, and computer program product are provided for facilitating radio access network integration with data centers. Mobile network configuration information is obtained identifying threshold latency and distance criteria and network function operating criteria. Data center information is obtained for a plurality of data centers. Latencies between a plurality of radio base stations and the plurality of data centers are determined. A primary data center and a backup data center are selected to interconnect with each radio base station based on a geographical distance between each data center and each radio base station satisfying the threshold distance and latency criteria. Network function pool configuration information is generated for the primary data center and the backup data center. A domain name system (DNS) server and a network repository function (NRF) are configured based on the network function pool configuration information.

20 Claims, 17 Drawing Sheets

(56) References Cited

U.S. PATENT DOCUMENTS

| | | | |
|---|---|---|---|
| 2014/0258374 A1* | 9/2014 | Suryanarayanan | H04L 67/1021 709/203 |
| 2019/0053010 A1* | 2/2019 | Edge | H04W 4/029 |
| 2020/0106858 A1* | 4/2020 | Huang | H04L 45/04 |
| 2020/0322836 A1* | 10/2020 | Lekutai | H04W 28/0236 |
| 2020/0403876 A1* | 12/2020 | Liu | H04L 67/1021 |
| 2021/0168626 A1* | 6/2021 | Okawa | H04W 52/0206 |
| 2021/0258766 A1* | 8/2021 | Watanabe | H04W 48/16 |
| 2022/0070714 A1* | 3/2022 | Opshaug | H04W 64/00 |
| 2022/0322065 A1* | 10/2022 | Shekhar | H04W 24/08 |
| 2022/0369196 A1* | 11/2022 | Kodaypak | H04W 48/16 |

FOREIGN PATENT DOCUMENTS

| | | | | |
|---|---|---|---|---|
| JP | 2004062510 A | * | 2/2004 | |
| WO | WO-2022169448 A1 | * | 8/2022 | H04B 7/18563 |

OTHER PUBLICATIONS

T. Bray, Ed., "The JavaScript Object Notation (JSON) Data Interchange Format," Internet Engineering Task Force (IETF), Request for Comments: 8259, Obsoletes: 7159, Category: Standards Track, ISSN: 2070-1721, Dec. 2017, 16 pages.

Saud Albazei, "What to Consider when Selecting a Region for your Workloads," AWS, AWS Architecture Blog, https://aws.amazon.com/blogs/architecture/what-to-consider-when-selecting-a-region-for-your-workloads/, Sep. 20, 2021, 5 pages.

"Azure Geographies," Azure, https://azure.microsoft.com/en-us/explore/global-infrastructure/geographies/#overview, retrieved from the Internet on May 23, 2023, 9 pages.

* cited by examiner

| Record | gNB | AMFPool | DC | IP Address |
|---|---|---|---|---|
| record-gNB-1 | gNB-1 | AMFPool-1 | DC-1 | AMF-11: 198.18.6.2 |
| | | | DC-1 | AMF-12: 198.18.6.1 |
| | | | DC-2 | AMF-21: 198.19.8.1 |
| | | | DC-2 | AMF-22: 198.19.8.2 |

FIG.6A

| Record | gNB | AMFPool | DC | IP Address |
|---|---|---|---|---|
| record-gNB-2 | gNB-2 | AMFPool-1 | DC-1 | AMF-11: 198.18.6.2 |
| | | | DC-1 | AMF-12: 198.18.6.1 |
| | | | DC-2 | AMF-21: 198.19.8.1 |
| | | | DC-2 | AMF-22: 198.19.8.2 |

| Record | gNB | AMFPool | DC | IP Address |
|---|---|---|---|---|
| record-gNB-3 | gNB-3 | AMFPool-2 | DC-3 | AMF-31: 198.20.5.1 |
| | | | DC-3 | AMF-32: 198.20.5.2 |
| | | | DC-4 | AMF-41: 198.21.4.1 |
| | | | DC-4 | AMF-42: 198.21.4.2 |

| Record | gNB | AMFPool | DC | IP Address |
|---|---|---|---|---|
| record-gNB-4 | gNB-4 | AMFPool-1 | DC-1 | AMF-11: 198.18.6.2 |
| | | | DC-1 | AMF-12: 198.18.6.1 |
| | | | DC-2 | AMF-21: 198.19.8.1 |
| | | | DC-2 | AMF-22: 198.19.8.2 |

| Record | Network-element-profile/SMFPool | DC | IP Address |
|---|---|---|---|
| record-smf-11 | SMF_Pool_11 | DC-1 | primary ip-address ipv4 172.16.186.14 primary ip-address port 9050 |
| | | DC-1 | primary ip-address ipv4 172.16.186.14 primary ip-address port 9050 |
| | | DC-2 | primary ip-address ipv4 172.16.187.12 primary ip-address port 9050 |
| | | DC-2 | primary ip-address ipv4 172.16.187.14 primary ip-address port 9050 |

| Record | eNB | MMEPool | DC | IP Address |
|---|---|---|---|---|
| record-eNB-1 | eNB-1 | MMEPool-1 | DC-1 | MME-11: 198.18.6.2 |
| | | | DC-1 | MME-12: 198.18.6.1 |
| | | | DC-2 | MME-21: 198.19.8.1 |
| | | | DC-2 | MME-22: 198.19.8.2 |

| Name | ... | ... | Port | IP Address |
|---|---|---|---|---|
| Tac-lb(0x2).tac_hb(0x4.tac.epc.mnc<111>.mcc<22>.3gppnetwork.org | MME | ... | 3590 | cis01.sp.example.com<br>cis02.sp.example.com |

| Location | UPFGroup | UPF |
|---|---|---|
| Tac-lb(0x2).tac_hb(0x4.tac.epc.mnc<111>.mcc<22>.3gppnetwork.org | UPFGrp-1 | 198.18.6.1<br>198.18.6.2<br>198.18.6.3<br>198.18.6.4 |
| Tac-lb(0x3).tac_hb(0x1.tac.epc.mnc<111>.mcc<22>.3gppnetwork.org | UPFGrp-2 | 198.20.5.1<br>198.20.5.2<br>198.20.5.3<br>198.20.5.4 |

FIG. 6H

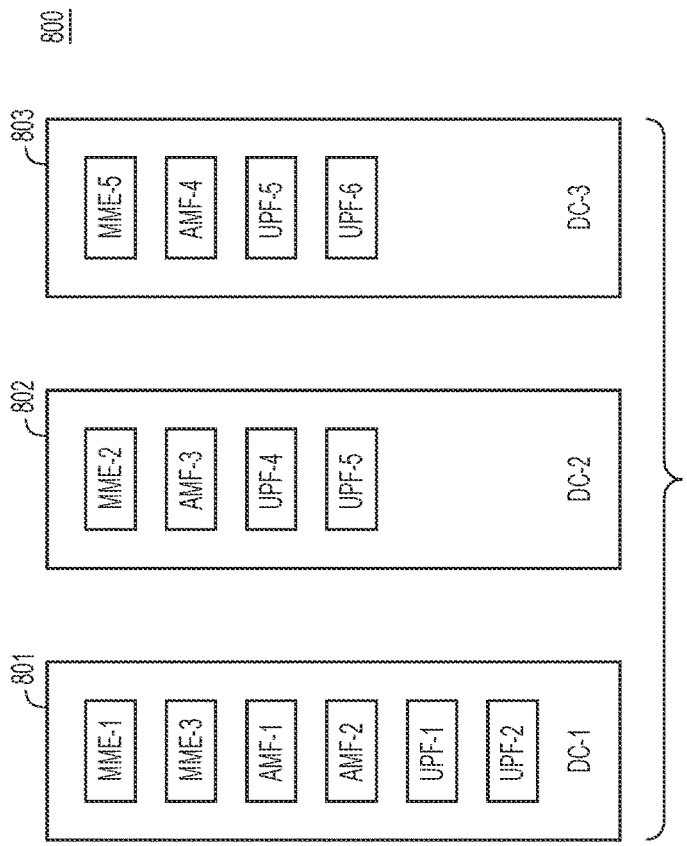

FACILITATING RADIO ACCESS NETWORK INTEGRATION WITH DATA CENTERS

TECHNICAL FIELD

The present disclosure relates generally to network equipment and services.

BACKGROUND

Networking architectures have grown increasingly complex in communications environments, particularly mobile networking environments. In particular, mobile communication networks have grown substantially as end users become increasingly connected to mobile network environments. As the number of mobile users increases, efficient management of communication resources becomes more critical.

BRIEF DESCRIPTION OF THE DRAWINGS

FIGS. 6A-6H are tables showing various records that are generated, according to an example embodiment.

FIG. 8A is a block diagram depicting an environment including data centers and hosted network functions, according to an example embodiment.

FIG. 8B is a table of network function pools corresponding to the environment depicted in FIG. 8A, according to an example embodiment.

DETAILED DESCRIPTION

Overview

Figure 1:
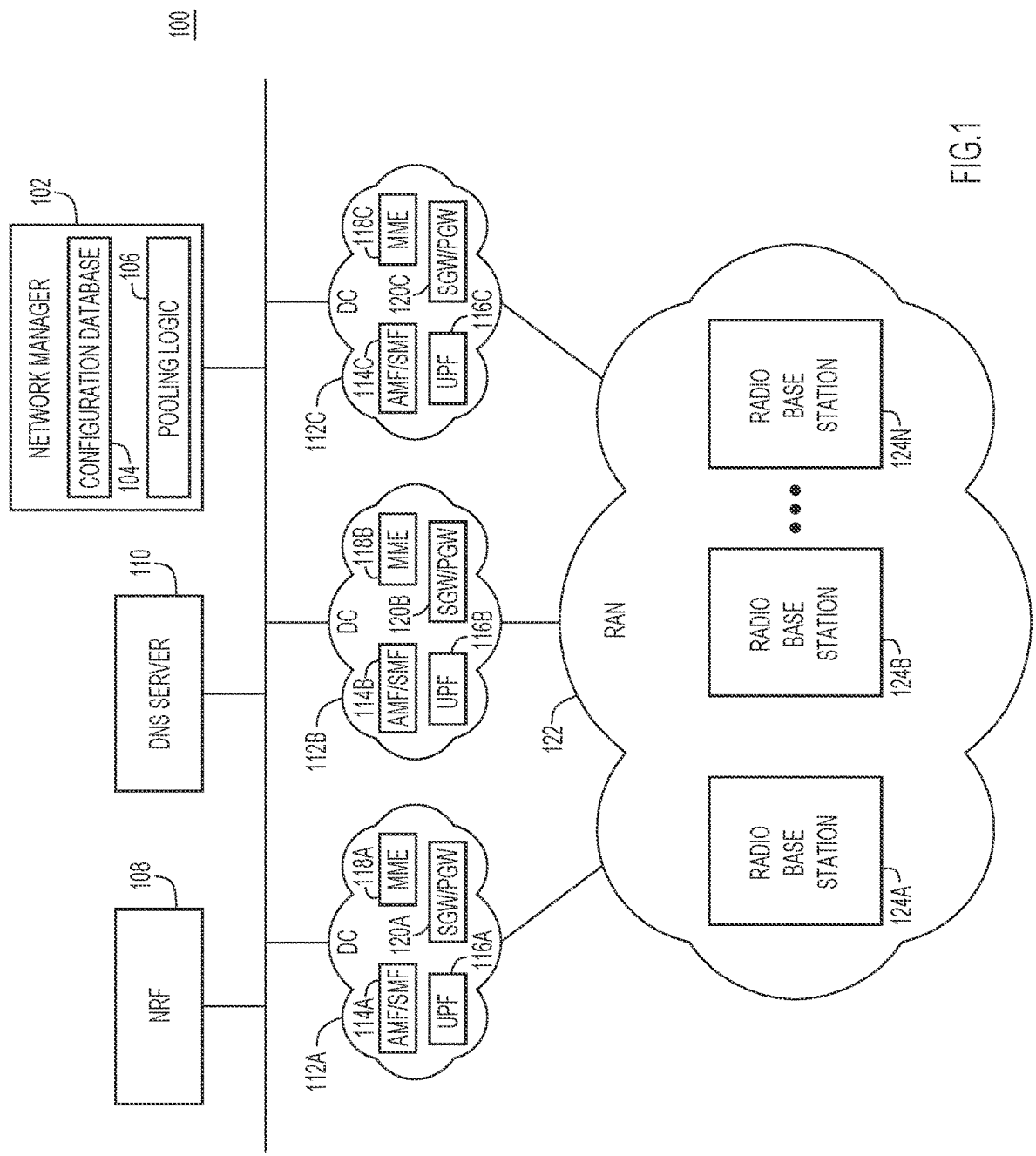
FIG. 1 is a block diagram of a network environment, according to an example embodiment.

According to one embodiment, techniques are provided for facilitating radio access network integration with data centers. Mobile network configuration information is obtained identifying threshold latency criteria, threshold distance criteria, and network function operating criteria. Data center information is obtained for each of a plurality of data centers. Latencies between each of a plurality of radio base stations and each of the plurality of data centers are determined. A primary data center and a backup data center are selected to interconnect with each radio base station based on a geographical distance between each data center and each radio base station satisfying the threshold distance criteria, and based on the determined latencies satisfying the threshold latency criteria. Network function pool configuration information is generated for the primary data center and the backup data center. A domain name system (DNS) server and a network repository function (NRF) are configured based on the network function pool configuration information.

EXAMPLE EMBODIMENTS

5G Core (5GC) Networking is available across multiple data centers (DCs) and Edge-DCs. A challenge for mobile network service providers (SPs) is how and where to integrate their networks: where to deploy the 5GC network functions (Access network functions (NFs), SMFs, UPFs, etc.) so that a SP RAN can be optimally integrated with a 5GC while satisfying Service Level Agreements (SLAs) regarding redundancy, packet latency, meeting scaling requirements, handoff scenarios optimization, and the like. As DCs and RANs can be distributed across large geographic areas, making such a selection and determining/creating NF pools (e.g., AMF pools, MME pools, etc.) can be difficult.

To address this problem, the embodiments presented herein provide an automated approach to identifying DCs that can be integrated with radio base stations of a RAN (e.g., eNodeBs, gNodeBs, etc.) based on satisfying latency criteria between each radio base station and each DC. In particular, one or more DCs can be selected for each radio base station; for example, a first DC may be selected as a primary DC and a second DC may be selected as a backup DC. The DCs may be selected based on network latency between each DC and the radio base station and/or geographical distance between each DC and the radio base station. For example, a DC that otherwise satisfies a latency criterion may nevertheless be excluded from consideration if that DC is beyond a threshold geographical distance from the radio base station. 5GC network functions of the selected DCs can then be assigned to pools from which each radio base station can access the 5GC network functions. In some embodiments, additional criteria may be considered when assigning 5GC network functions to pools, such as available computing resources, etc.

Thus, present embodiments provide an improved approach to facilitating radio access network integration in a manner that optimizes which DCs, and accordingly, 5GC network functions, are assigned to a particular radio base station. Using this approach, present embodiments provide the practical applications of improving access to DCs and 5GC network functions, decreasing latency, and improving the overall quality of service for end users.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments will now be described in detail with reference to the Figures. Reference is now made to FIG. 1. FIG. 1 is a block diagram of a network environment 100, according to an example embodiment. As depicted, network environment 100 includes a network manager 102, a Network Repository Function (NRF) 108, a Domain Name System (DNS) server 110, a plurality of Data Centers (DCs) 112A-112C, and a Radio Access Network (RAN) 122. Each DC 112A, 112B and 112C may include one or more network functions, including Access and Mobility Management Functions (AMFs)/Session Management Functions (SMFs) 114A, 114B and 114C, User Plane Functions (UPFs) 116A, 116B and 116C, Mobility Management Entities (MMEs) 118A, 118B and 118C, and Serving Gateways (SGWs)/Packet Data Network Gateways (PGWs) 120A, 120B and 120C. RAN 122 may include a plurality of radio base stations 124A, 124B, . . . , 124N, which may include gNodeBs and/or eNodeBs. It is to be understood that the functional division among components have been chosen for purposes of explaining various embodiments and is not to be construed as a limiting example. Each element of network environment 100 may be a physical entity or a virtual entity, and may include one or more modules or units to perform various functions of the embodiments described below. Each element of network environment 100 may be implemented by any combination of any quantity of software and/or hardware modules or units.

Network Manager 102 is a core network entity in network environment 100 that is responsible for providing application-specific functionality and services by integrating with NRF 108 and/or other elements of network environment 100. Network manager 102 may include network management functions that interacts with the core network and other network functions to provide a variety of services, such as authentication and authorization of user equipment (UEs) to access specific applications and services, session management, traffic management, service chaining, Quality of Service (QOS) management, analytics and reporting to network operators, and other tasks. In particular, network manager 102 may include a configuration database 104 and pooling logic 106. In some embodiments, network manager 102 is responsible for initiating the collection of latency data between DCs 112A-112C and radio base stations 124A-124N.

Configuration database 104 may store data relating to the various elements of network environment 100, including geographical locations, network addresses, tracking area code (TAC) information, roles of each element, available services or functions, and the like. In some embodiments, configuration database 104 stores data that indicates the geographical locations of each DC 112A-112C and/or the geographical locations of each radio base station 124A-124N. In some embodiments, configuration database 104 stores data that indicates the various network functions of each DC 112A-112C (e.g., each AMF/SMF 114A-114C, UPF 116A-116C, MME 118A-118C, SGW/PGW 120A-120C, etc.), as well as the properties of each network function (e.g., available computing resources, capacity, particular logic or protocols that are implemented/supported by each network function, etc.). Configuration database 104 may enable network manager 102 to support various RAN architectures, including fourth-generation (4G) and/or fifth-generation (5G) networks.

Pooling logic 106 includes logic for implementing network function pooling in accordance with present embodiments. In particular, pooling logic 106 may define criteria for pooling particular network functions into a given pool (e.g., an AMF/SMF pool, a UPF pool, an MME pool, an SGW/PGW pool) that can be assigned to a radio base station. The criteria defined in the pooling logic may indicate particular perquisites or preferences for adding each type of network function to a pool. In some embodiments, an MME may be assigned to a pool when the MME's capacity has a predetermined level of availability (e.g., by considering the MME's current processing utilization with regard to the amount of processing demand that serving an additional base radio station will consume). Likewise, the other network functions may only be considered as eligible to be added to their respective pool types if they satisfy predetermined criteria, such as processing resource criteria, memory resource criteria, storage resource criteria, bandwidth resource criteria, and the like.

NRF 108 is a core network entity of network environment 100 that provides a centralized repository for network functions and services. NRF 108 may maintain information about available network functions and services, including their locations and capabilities. The functions of NRF 108 can include service discovery, service registration, service capability exposure, load balancing, network slicing, and/or other functions and services. In particular, NRF 108 provides service registration by enabling network functions and services (e.g., AMFs/SMFs 114A-114C, UPFs 116A-116C, MMEs 118A-118C, SGWs/PGWs 120A-120C, etc.) to register with the NRF 108, enabling the network functions to be discoverable by other network entities. Once a particular service or function is registered with NRF 108, other network entities can determine whether that particular service or function is available and/or suitable for their needs.

DNS server 110 may perform functions such as translating network names into network addresses (e.g., Internet Protocol (IP) address, etc.) that support communication with other network-accessible entities. As such, DNS server 110 may store records that include network names of entities (e.g., "DC 112A," "radio base station 124B," etc.) and their corresponding IP addresses. In some embodiments, radio base stations 124A-124N register with DNS server 110 so that the network addresses of each radio base station 124A-124N can be resolved.

DCs 112A-112C are data centers that may host core network functions and services, such as AMFs/SMFs 114A-114C, UPFs 116A-116C. MMEs 118A-118C, and SGWs/PGWs 120A-120C. Each DC 112A-112C may host one or more network functions, including multiple network functions of one or more type. In various embodiments, there may be any number of data centers, each hosting any number and/or type of network function. Each DC 112A-112C may provide computing, storage, and networking resources that are required to support network functions and services of network environment 100. DCs 112A-112C may be physically located in various facilities, which may be secure, temperature-controlled, and provided with redundant power supplies and network connections. It should be understood that the count and type of each network function in the example network environment 100 has been selected for the purpose of explaining various embodiments, and that in other embodiments, some DCs may have additional or fewer network functions, including multiple network functions of a given type, no network functions of a given type, and/or other types of network functions not depicted in network environment 100. Each DC 112A-112C may also provide virtualization technologies like Software-Defined Networking (SDN). Each DC 112A-112C may be connected to RAN 122 and other parts of the network through high-speed networking connections to ensure low latency and high throughput.

The AMFs/SMFs 114A-114C hosted by DCs 112A-112C may be responsible for managing the access and mobility of user devices in the network. In various embodiments, AMFs/SMFs 114A-114C may perform authentication and authorization of UEs to access network environment 100, as well as session management (by establishing and managing user sessions), mobility management (by tracking the location of UEs and managing handovers), security management (e.g., managing the security keys and certificates), QoS management, and/or policy enforcement. Each AMF/SMF 114A-114C may connect with a radio base station of radio base stations 124A-124N in order to establish and manage user sessions. When UEs establish a connection with network environment 100 through any of radio base station 124A-124N, an AMF or SMF (depending on whether the UE is a 4G or 5G device) may be responsible for managing the user session. This includes authenticating the user, setting up the security context, and managing the user's mobility as they move from one radio base station (e.g., gNodeB or eNodeB) to another. Additionally or alternatively, each AMF or SMF may be responsible for configuring radio base stations 124A-124N with the appropriate network parameters, such as QoS settings and access control policies. In some embodiments, each AMF/SMF 114A-114C may manage the allocation of network resources to user sessions by managing the radio resources allocated to the various radio base stations 124A-124C and ensuring that there is sufficient capacity to support the user sessions.

Each UPF 116A-116C may serve as a core network entity that is responsible for handling the user data traffic. The UPF performs several key functions related to data forwarding and processing, including data packet routing and forwarding, traffic filtration and policy enforcement, user data encapsulation/decapsulation, packet inspection, charging and billing, service-based routing, and/or network slicing.

Each MME 118A-118C is a core network entity in a 4G Long-Term Evolution (LTE) network that may perform key functions related to the mobility and session management of UEs. Each MME is responsible for handling signaling messages between the UEs and the core network. In various embodiments, MMEs perform functions that may include one or more of UE tracking and identification, UE authentication, managing the mobility of UEs (e.g., handovers), session management, charging and billing, and/or other functions or services.

Each SGW/PGW 120A-120C are core network entities in a 4G network that may be responsible for handling user data traffic and providing connectivity between the network and external packet data networks. Each SGW of SGWs/PGWs 120A-120C may perform services such as packet routing and/or forwarding, mobility management, charging and billing, and/or other functions. Each PGW of SGWs/PGWs 120A-120C may perform similar or other services, such as packet routing and/or forwarding, policy enforcement, charging and billing, network address allocation, and/or other functions or services.

RAN 122 is a radio access network that includes a plurality of radio base stations 124A-124C, which may include gNodeBs for a 5G network or eNodeBs for a 4G network. The network functions of DCs 112A-112N may be connected to radio base stations 124A-124N such that UEs can connect to RAN 122 in order to access other portions of network environment 100 and/or other networks (e.g., the Internet). UEs that are connected to RAN 122 may be managed by policies that are provided by the network functions of DCs 12A-112C to radio base stations 124A-124N so that UEs can be admitted to the network, handed over from one radio base station to another, and the like.

Each radio base station 124A-124N may include a gNodeB that supports a 5G network or an eNodeB that supports a 4G network. Radio base station 124A-124N may be physical or virtual, and each may support multiple UEs. Each radio base station 124A-124N may register with NRF 108, providing data such as their network addresses (e.g., Internet Protocol (IP) addresses), location data (e.g., latitude and longitude geolocation coordinates), latency data as measured between each radio base station 124A-124N and a particular DC 112A-112C, and/or any other desired data.

Figure 2:
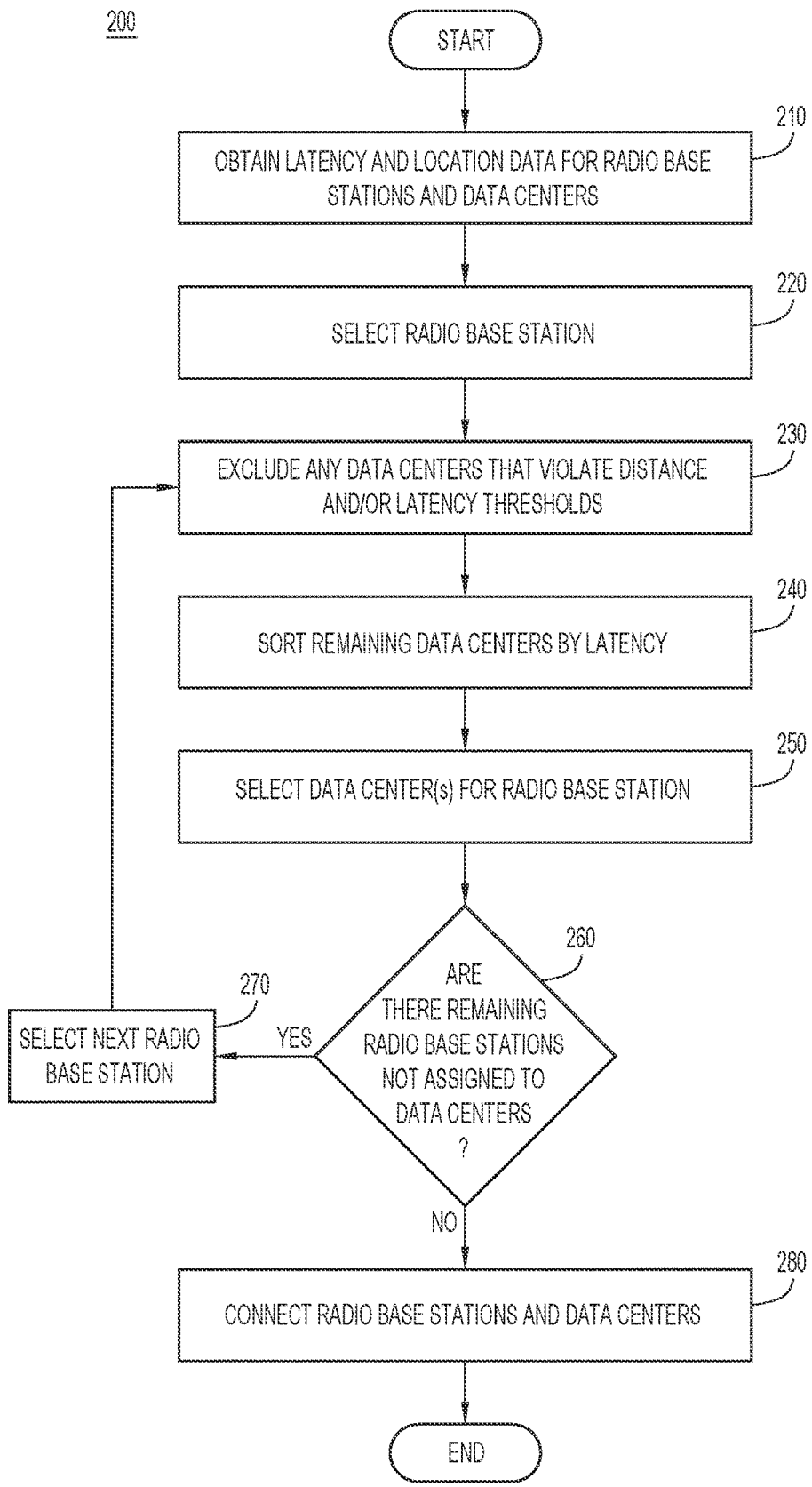
FIG. 2 is a flow chart of a method for facilitating radio base station interconnection with data centers, according to an example embodiment.

FIG. 2 is a flow chart of a method 200 for facilitating radio base station interconnection with data centers, according to an example embodiment.

Latency and location data is obtained for each radio base station and data center at operation 210. Ping tests may be performed between each DC (e.g., a DC of DCs 112A-112C) and a radio base station (e.g., a radio base station of radio base stations 124A-124N) to determine the latency (e.g., round-trip time (RTT)) between a given DC and radio base station.

A radio base station is selected at operation 220. Initially, any radio station of radio base station 124A-124N may be selected for processing. However, in some embodiments, a particular radio base station may be prioritized based on certain criteria, such as manual input that causes the radio base station to be prioritized, or the radio base station having a certain threshold number of UEs connected, or requesting to connect to, the radio base station. Once a radio base station is selected at operation 220, that same radio base station will be processed via operations 230-250.

Any data centers that violate distance and/or latency thresholds are excluded from consideration at operation 230. The geographical location of the radio base station currently being processed is compared to the geographical location of each DC (e.g., DCs 112A-112C) to identify any DCs that exceed a predetermined threshold distance criterion. Additionally or alternatively, the latency between the radio base station currently being processed and each DC is analyzed to identify any DCs that exceed a predetermined latency (e.g., RTT) criterion. Any identified DCs may be excluded from further consideration with regard to the subject radio base station.

The remaining data centers are sorted by latency at operation 240. Each remaining DC is sorted according to its latency with respect to the radio base station. After sorting, one or more data centers are selected for the radio base station at operation 250. In some embodiments, a lowest-latency DC may be selected; in other embodiments, two or more lowest-latency DCs may be selected, with one acting as a primary DC and additional DCs acting as a backup (e.g., secondary) DC. Once a DC is assigned to a radio base station, network function pools can be established in accordance with present embodiments, which is described in further detail below with reference to FIGS. 3A-3C.

Operation 260 determines whether there are any remaining radio base stations not assigned to data centers. If there are radio base stations that have not yet been paired with a DC, then method 200 proceeds to select a next radio base station at operation 270, which may select a radio base station similarly to operation 220. The next selected radio base station is subsequently processed via operations 230-250. If there are no remaining radio base stations (e.g., radio base stations unassigned to one or more DCs), then method 200 continues to operation 280.

The radio base stations and data centers are connected at operation 280. Initially, the network function pool information may be provided to a DNS server (e.g., DNS server 110) and an NRF (e.g., NRF 108) by a network manager (e.g., network manager 102). This network function pool information may include the pools of each network function, and accordingly the data centers hosting each network function, for each radio base station. Next, each radio base station is connected to the one or more DCs selected for that radio base station so that network functions can then be assigned to each radio base station. In various embodiments, the radio base stations may be connected to the DCs after assignment of all radio base stations to DCs, or each radio base station may be connected to its assigned DCs after that radio base station has been processed (e.g., before processing of a next radio base station). In at least one embodiment, the operation at 280 may involve the radio base stations sending a 3GPP standards-based Next Generation Application Protocol (NGAP) setup request to the DCs to which the DCs can respond with an NGAP setup response indicating successful connection between each radio base station and DC.

Figure 3A:
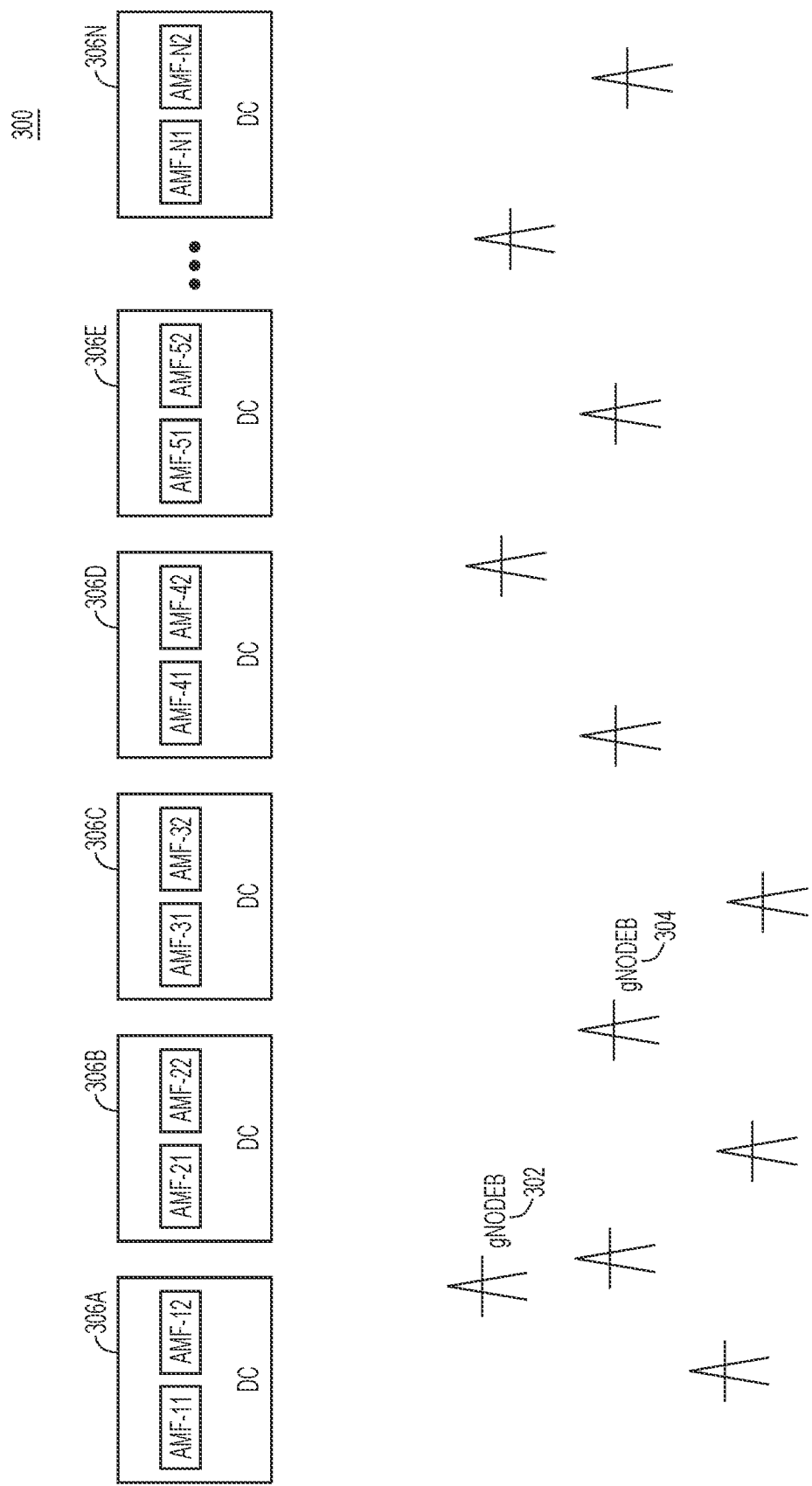
FIGS. 3A-3C are block diagrams of an environment in which radio base stations are connected to data centers and network function pools, according to an example embodiment.
Figure 3B:
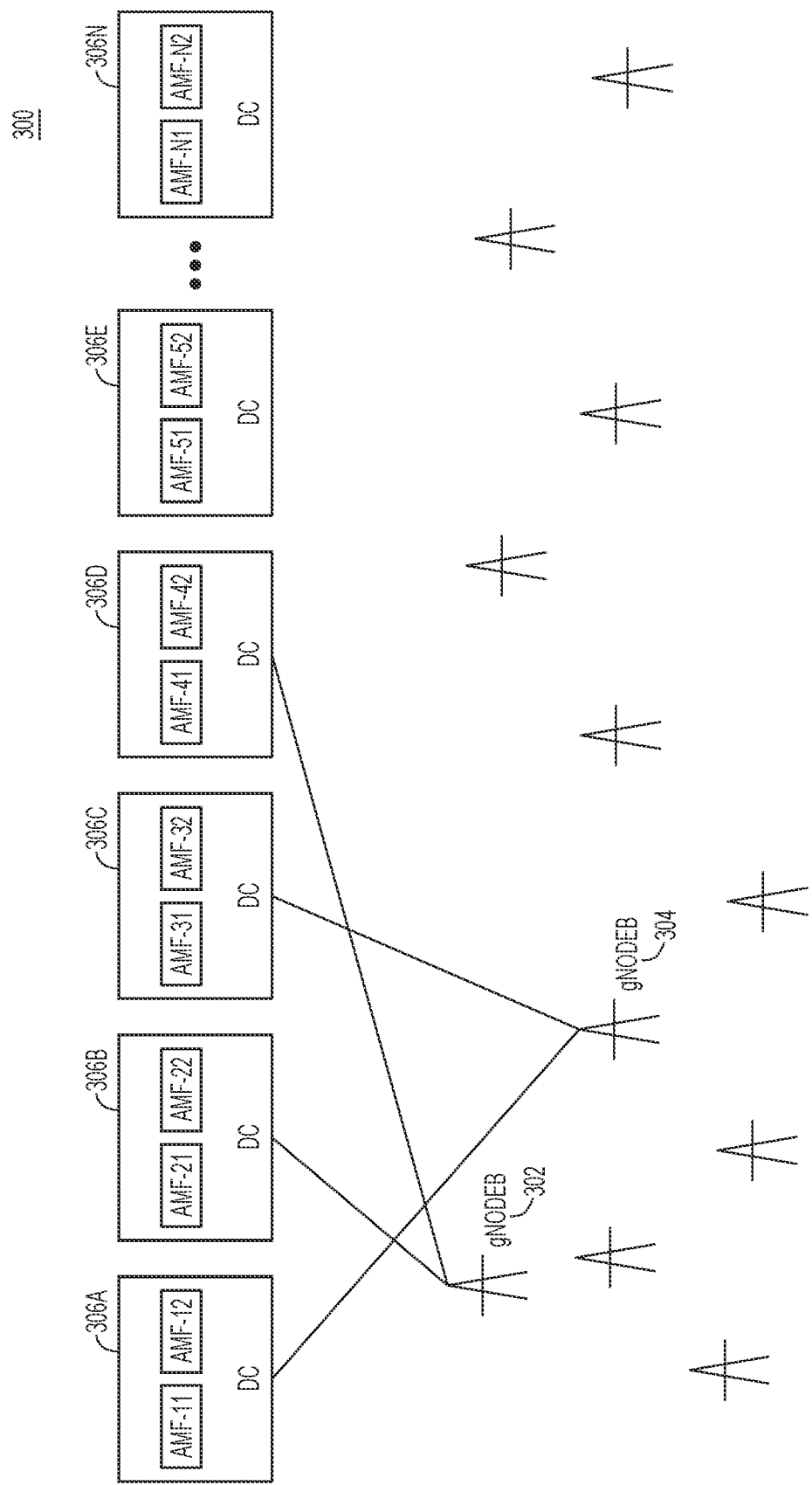
Figure 3C:
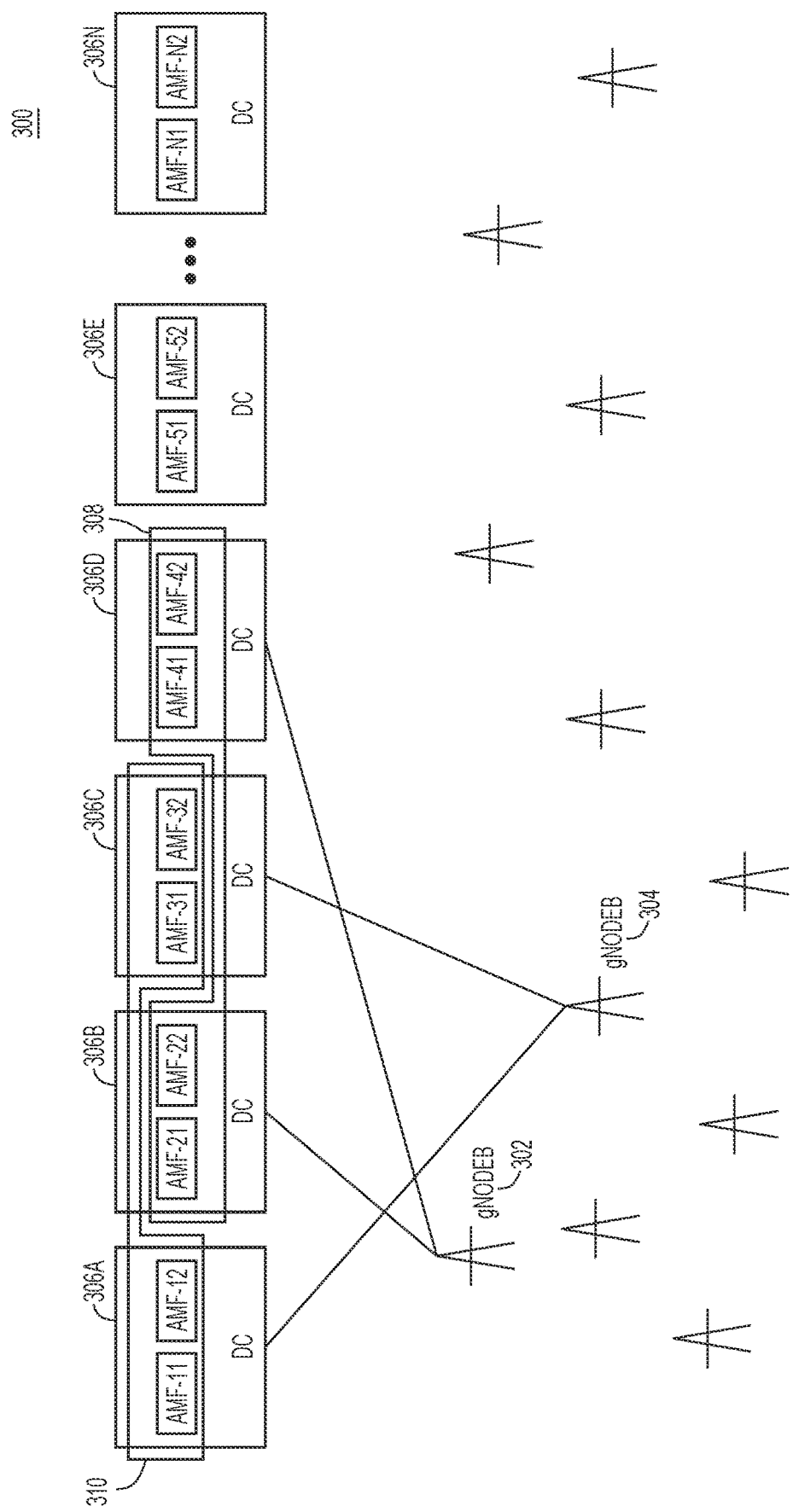

FIGS. 3A-3C are block diagrams of an environment 300 in which radio base stations are connected to data centers and network function pools, according to an example embodiment. As depicted, environment 300 includes a plurality of radio base stations, including gNodeBs 302 and 304, and a plurality of DCs 306A-306N. Each DC includes network functions; in the depicted example, the network functions include AMF-11 and AMF-12 in DC 306A, AMF-21 and AMF-22 in DC 306B, AMF-31 and AMF-32 in DC 306C, AMF-41 and AMF-42 in DC 306D, AMF-51 and AMF-52 in DC 306E, and AMF-N1 and AMF-N2 in DC 306N. It should be appreciated that the type of radio base stations (e.g., gNodeBs) and type of network function (e.g., AMFs) in the example embodiment of environment 300 are merely included as examples, and in various embodiments, any number and/or type of radio base stations (e.g., eNodeBs), DCs, and/or network functions may be included as desired, including different types of network functions (e.g., AMFs, MMEs, SMFs, UPFs, SGWs, PGWs, etc.). In the examples of FIGS. 3A-3C, it should be assumed that any DC-gNodeB distance criteria are satisfied for any shown poolings.

With reference now to FIG. 3A, environment 300 depicts gNodeBs 302 and 304 that have not yet been processed in accordance with present embodiments, and are thus not initially paired with any DCs. gNodeBs 302 and 304 may be processed in accordance with present embodiments by analyzing the latency between gNodeB 302 and DCs 306A-306N and by analyzing the latency between gNodeB 304 and DCs 306A-306N.

With reference now to FIG. 3B, the latencies between each gNodeB and DC have been analyzed and gNodeBs 302 and 304 have each been paired with two DCs. In the example embodiment of FIG. 3B, gNodeB 302 has been paired with DC 306B and DC 306D, and gNodeB 304 has been paired with DC 306A and DC 306C. Once one or more DCs are connected to a radio base station, the network functions provided by each DC can be analyzed and added to a network function pool that may be utilized by the radio base station. In the case of MMEs, each MME's processing capacity may be analyzed in view of the estimated or actual processing requirements of a radio base station before determining whether the MME can be assigned to a pool for that radio base station. In some embodiments, the number of UEs associated with a radio base station may be compared to a network function's available processing resources to determine whether the radio base station's associated UEs would cause the network function's processing resources to be exceeded. Thus, only network functions that satisfy certain criteria may be added to a network function pool for a particular radio base station.

In FIG. 3C, environment 300 is depicted after assigning AMFs to AMF pools for each radio base station. As depicted, AMF pools 308 and 310 have been created and assigned to gNodeB 302 and gNodeB 304, respectively. Thus, gNodeB 302 may utilize any of AMF-21, AMF-22, AMF-41, and/or AMF-42, whereas gNodeB 304 may utilize any of AMF-11, AMF-12, AMF-31, and/or AMF-32. While not depicted in FIG. 3, it should be appreciated that each DC may include other AMFs that are not included in AMF pools 308 or 310; similarly, each DC may also include other types of network functions which are similarly pooled and associated with radio base stations.

Figure 4A:
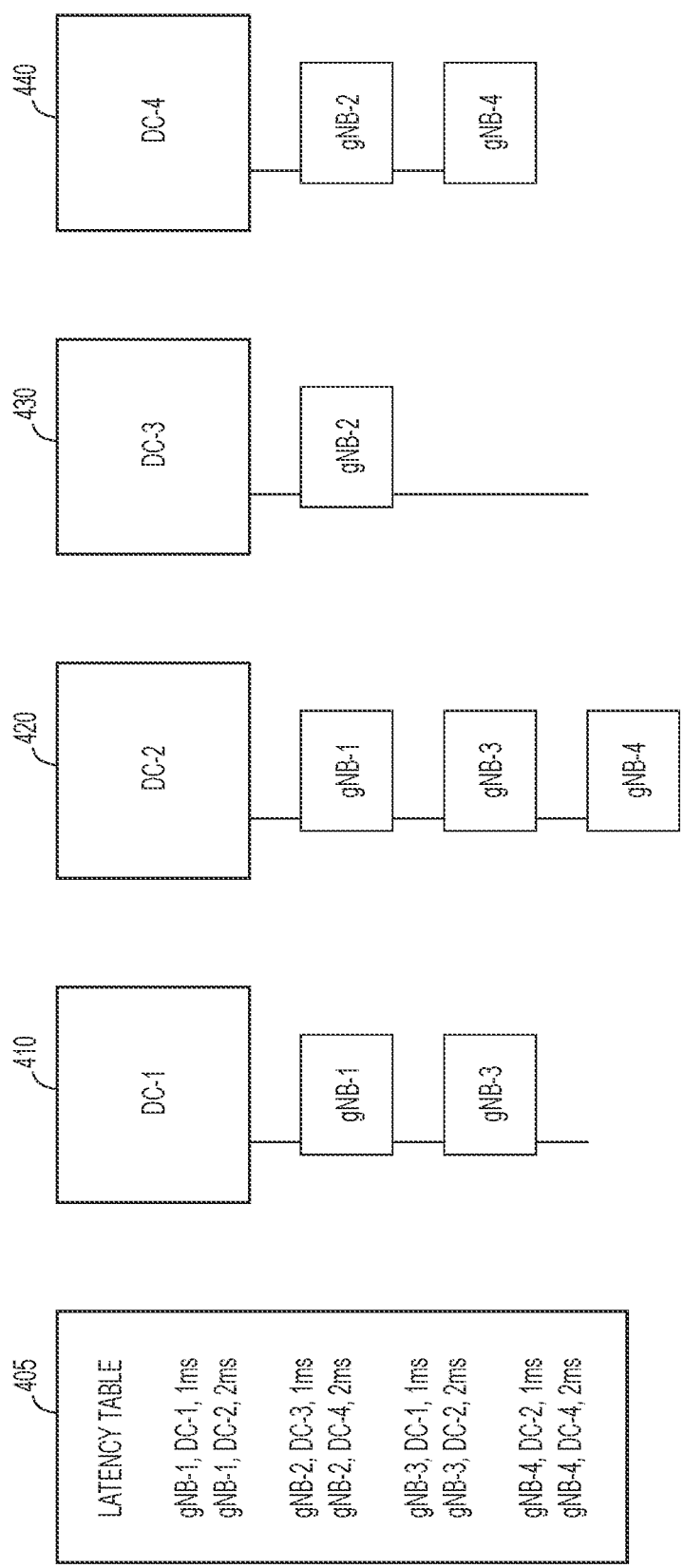
FIGS. 4A-4D are diagrams of a process for connecting gNodeBs to data centers, according to an example embodiment.

FIGS. 4A-4D are diagrams of a process for connecting gNodeBs to data centers, according to an example embodiment. As depicted in FIG. 4A (operation 400), there are four proposed pairings 410-440 between DCs (i.e., DC-1, DC-2, DC-3, and DC-4) and gNBs (i.e., gNB-1, gNB-2, gNB-3, and gNB-4) as well as a latency table 405 that provides latencies between each gNB that is associated with each DC. Each proposed pairing 410-440 may include only the DC-gNodeB relationships that do not already exceed latency or distance criteria; for example, gNB-4 may not be listed under DC-3 in proposed pairing 430 because gNB-4 is too far from DC-3 and/or because the latency between gNB-4 and DC-3 exceeds a latency criterion.

As depicted, latency values are provided between DC-1 and each of gNB-1 and gNB-3 in proposed pairing 410, latency values are provided between DC-2 and each of gNB-1, gNB-3, and gNB-4 in proposed pairing 420, latency values are provided between DC-3 and gNB-2 in proposed pairing 430, and latency values are provided between DC-4 and each of gNB-2 and gNB-4 in proposed pairing 440. Thus, pool 450, which includes DC-1 and DC-2, is created.

Figure 4B:
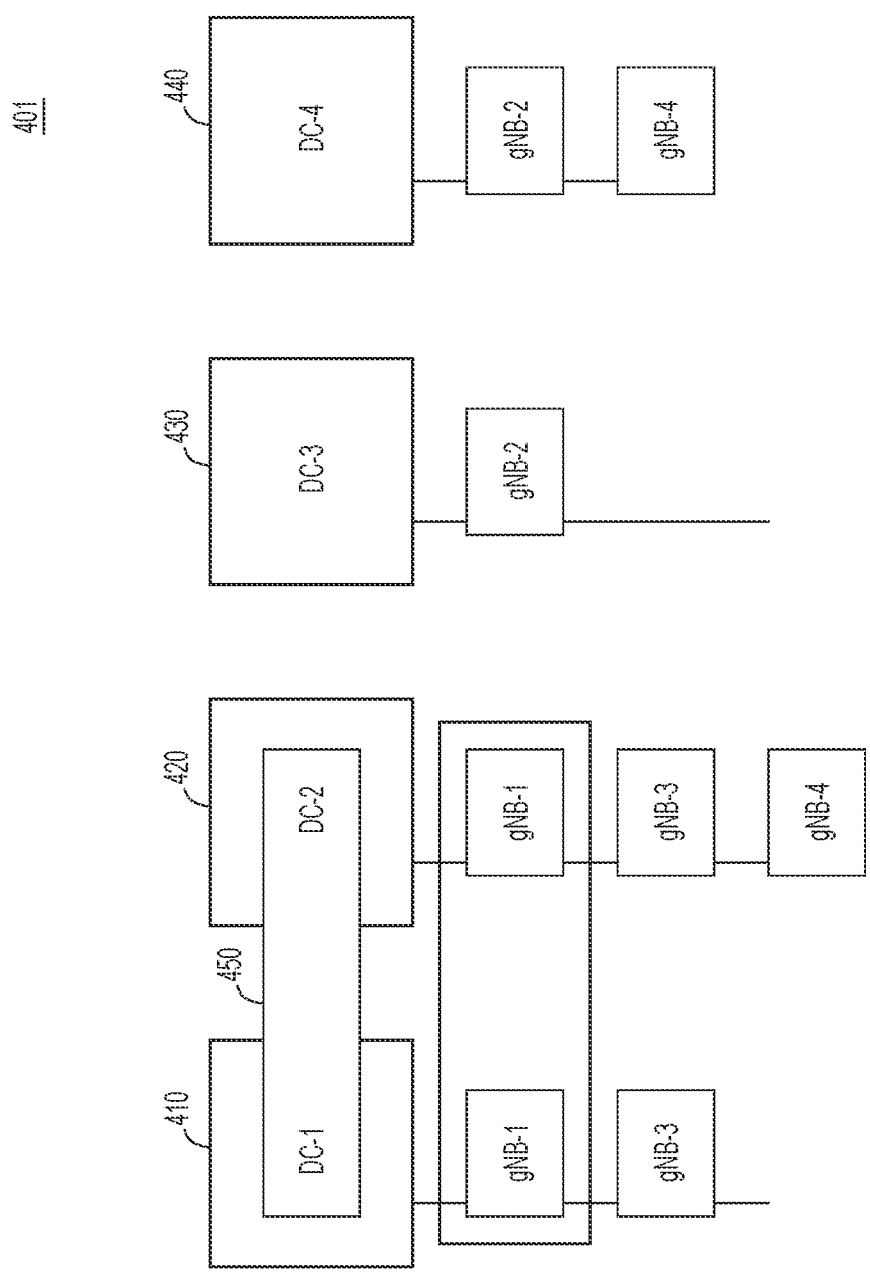

With reference now to FIG. 4B, operation 401 includes the assignment of gNB-1 to DC-1 and DC-2. Based on the latency values, it is determined that DC-1 has the lowest latency with respect to gNB-1. Additionally, DC-2 has a next-lowest latency with respect to gNB-1, so gNB-1 may be paired with DC-2 as a secondary DC. Thus, pool 460 is created and includes DC-3 and DC-4.

Figure 4C:
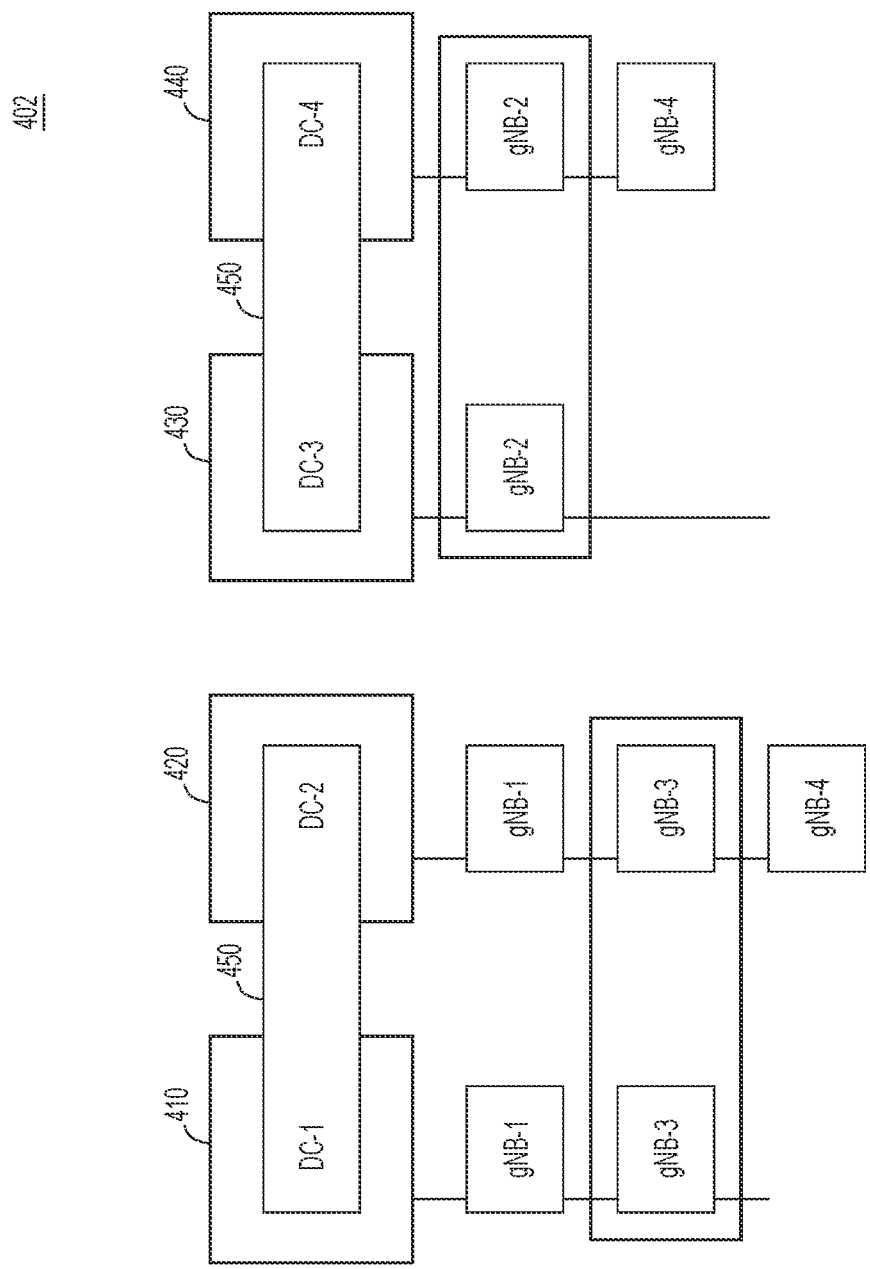

With reference now to FIG. 4C, operation 402 includes the assignment of gNB-3 to DC-1 and DC-2, as well as the assignment of gNB-2 to DC-3 and DC-4. As DC-3 has the lowest latency with respect to gNB-2, DC-3 may be paired with gNB-2. Additionally, gNB-2 may be paired with DC-4, which has the next lowest latency with respect to gNB-2. Similarly, gNB-3 may be paired with DC-1 and DC-2, based on their respective latency values. Thus, operation 402 assigns pool 450 to gNB-3 and pool 460 to gNB-2.

Figure 4D:
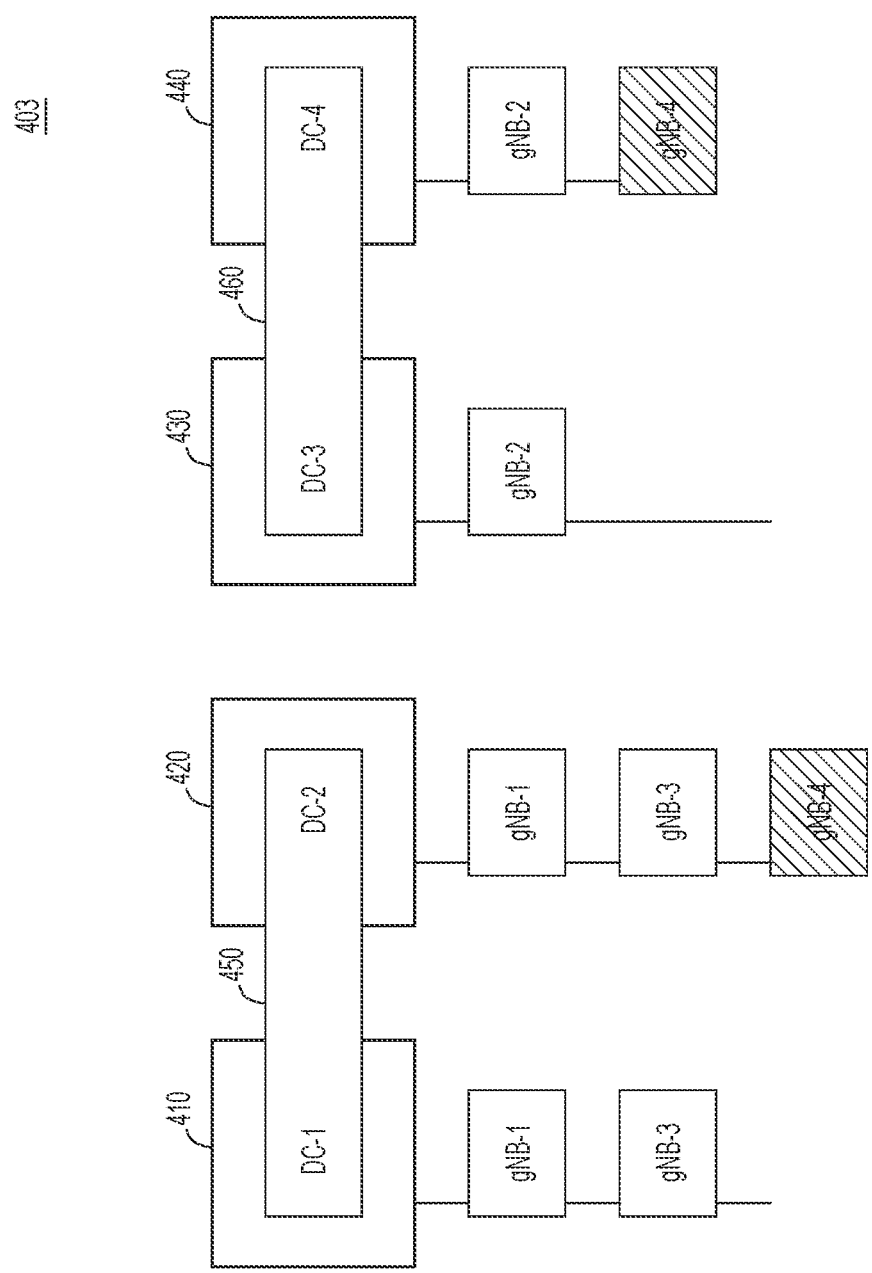

With reference now to FIG. 4D, operation 403 includes the assignment of gNB-4 to DC-2 and DC-4. In this depicted example, gNB-4 is an outlier with respect to the other gNodeBs, as now that pools 450 and 460 have been defined, gNB-4 is not eligible to connect to all DCs of either pool. Accordingly, a DC with the lowest latency to gNB-4 may be selected initially; in the depicted example, DC-2 has a lower latency with respect to gNB-4 than DC-4, so DC-2 may be selected. Next, if the other DC of pool 450 (i.e., DC-1) has a latency with respect to gNB-4 that is within a standard deviation (or other predefined range) of the latency criterion, then gNB-4 may be connected to pool 450. Otherwise, the latencies of the DCs in pool 460 can be compared to gNB-4, and if each latency is within a standard deviation (or other predefined range) of the latency criterion, then gNB-4 may instead be assigned to pool 460. If gNB-4 does not meet the criteria for assignment to either pool 450 or 460, then an alert may be automatically provided to a network administrator to indicate that the network may require further inspection, including troubleshooting, repair, etc.

Figure 5:
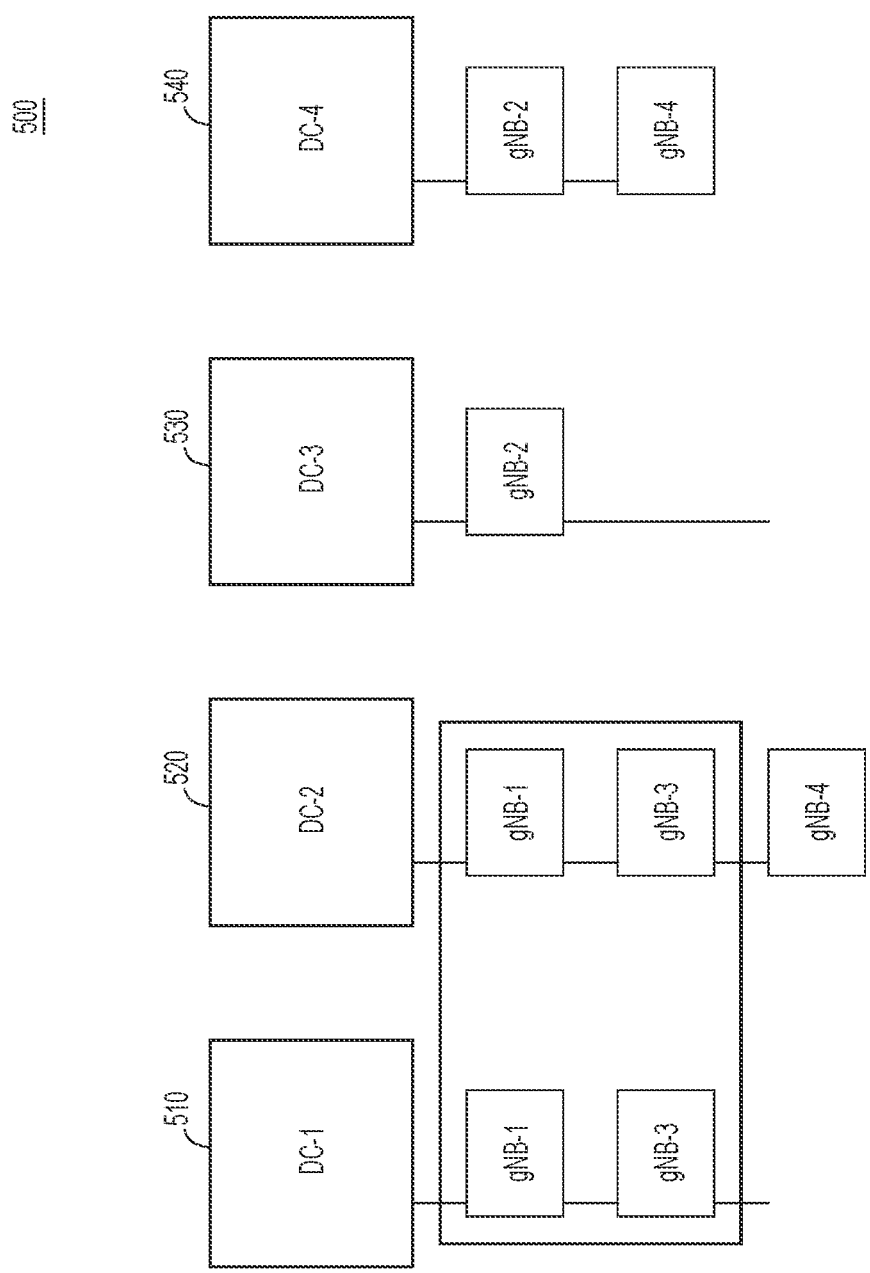
FIG. 5 is a diagram of a process for connecting gNodeBs to data centers, according to an example embodiment.

FIG. 5 is a diagram of a process 500 for connecting gNodeBs to data centers, according to an example embodiment. Four proposed pairings 510-540 are provided similarly to the proposed pairings of FIGS. 4A-4D. However, process 500 depicts an embodiment in which DC-gNodeB assignments are performed by first identifying any gNodeBs that are commonly included in proposed pairings with DCs, and then identifying DC groups that include the highest number of common gNodeBs. In the depicted example, DC-1 and DC-2 have the highest number of common gNodeBs, as gNB-1 and gNB-3 are both in proposed pairings 510 and 520. In contrast, other DC-DC groups only included one common gNodeB (i.e., DC-2 and DC-4 include gNB-4 in common, and DC-3 and DC-4 include gNB-2 in common). Next, the remaining unpaired DCs are processed: pairings between any of the remaining DCs and either DC-1 or DC-2 are ignored, as DC-1 and DC-2 already form a pair. Thus, DC-3 and DC-4 are left to be paired with each other. As gNB-2 is included in both proposed pairings 530 and 540, then gNB-2 may be added to the DC-3-DC-4 group. The remaining gNodeB, gNB-4, may be added to a group whose constituent DCs either satisfy, or fall within a threshold range (e.g., one standard deviation), the latency criterion between gNB-4 and the DCs.

FIGS. 6A-6H are tables showing various records (e.g., entries) that are generated, according to an example embodiment. The data in the records depicted in FIGS. 6A-6H may be generated according to the techniques that are depicted and described with reference to FIGS. 4A-5. Each record depicted in FIGS. 6A-6H may be stored in one or more locations, including NRF 108, DNS server 110, and/or network manager 102 of network environment 100.

With reference now to FIG. 6A, table 600 includes a record, "record-gNB-1" for a gNodeB (e.g., gNB-1 of FIGS. 4A-5). As depicted, table 600 includes a record column 601, gNodeB identifier column 602, AMF Pool identifier column 603, DC identifier column 604, and IP address column 605. Thus, record-gNB-1 indicates that gNB-1 is assigned to AMFPool-1 and DC-1 and DC-2. IP addresses for each AMF in AMFPool-1 are also shown along with the corresponding DC for each AMF.

With reference now to FIG. 6B, table 610 includes a record, "record-gNB-2" for a gNodeB (e.g., gNB-2 of FIGS. 4A-5). As depicted, table 610 includes a record column 611, gNodeB identifier column 612, AMF Pool identifier column 613, DC identifier column 614, and IP address column 615. Thus, record-gNB-2 indicates that gNB-2 is assigned to AMFPool-1 and DC-1 and DC-2. IP addresses for each AMF in AMFPool-1 are also shown along with the corresponding DC for each AMF. Likewise, with reference to FIG. 6C, table 620 includes record-gNB-3, as indicated in record column 621, and shows assignment of gNB-3 (gNodeB column 622) to AMFPool-2 (AMF column 623) and DC-3 and DC-4 (DC column 624), along with corresponding IP addresses for AMFs (IP address column 625). Finally, with reference to FIG. 6D, table 630 includes record-gNB-4, as indicated in record column 631, and shows assignment of gNB-4 (gNodeB column 632) to AMFPool-2 (AMF column 633) and DC-3 and DC-4 (DC column 634), along with corresponding IP addresses for AMFs (IP address column 635).

With reference to FIG. 6E, table 640 depicts an example NRF record for selecting an SMF. As depicted, record column 641 indicates that record-smf-11 stores the assignment of SMF_Pool_11 (Network element profile/SMFPool column 642) to DC-1 and DC-2 (DC column 643), along with the corresponding IP addresses and ports for each DC (IP Address column 644).

With reference to FIG. 6F, table 650 depicts an example eNodeB record for MME selection. As depicted, table 650 includes record-eNB-1 (record column 651) which indicates that eNB-1 (eNodeB column 652) is assigned to MME-Pool-1 (MME Pool column 653) and DC-1 and DC-2 (DC column 654). Each DC's individual MMEs and corresponding IP addresses are shown in IP Address column 655).

With reference now to FIG. 6G, table 660 includes a DNS record for an MME selecting a control plane entity (e.g., SGW/PGW). As depicted, record name column 661 indicates that the record assigns an MME (entity column 662) to two hosts (host column 664) using a particular port 3590 (port column 663).

With reference now to FIG. 6H, table 670 depicts example NRF records for selecting a UPF based on a TAC. As depicted, record column 671 includes two records that each indicate the relationship between UPF groups and the corresponding UPFs assigned to each group. UPF Group column 672 shows two UPF groups, UPFGrp-1 and UPFGrp-2, and UPF column 673 includes the corresponding IP addresses of the UPFs assigned to each group.

Figure 7A:
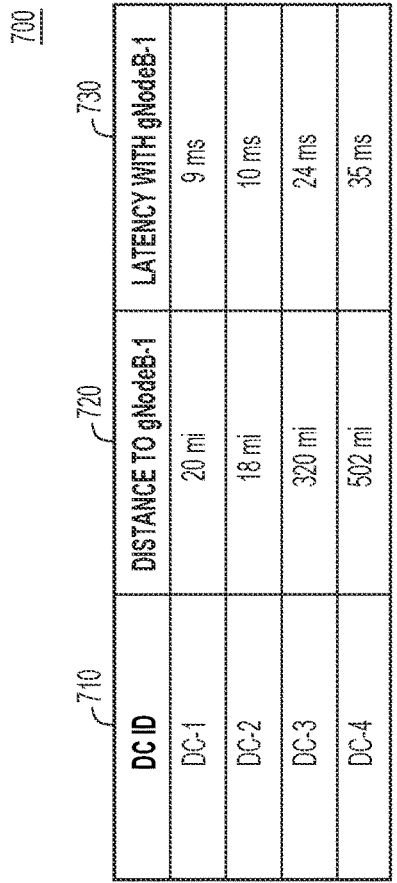
FIGS. 7A and 7B are tables of data center and gNodeB network data, according to an example embodiment.
Figure 7B:
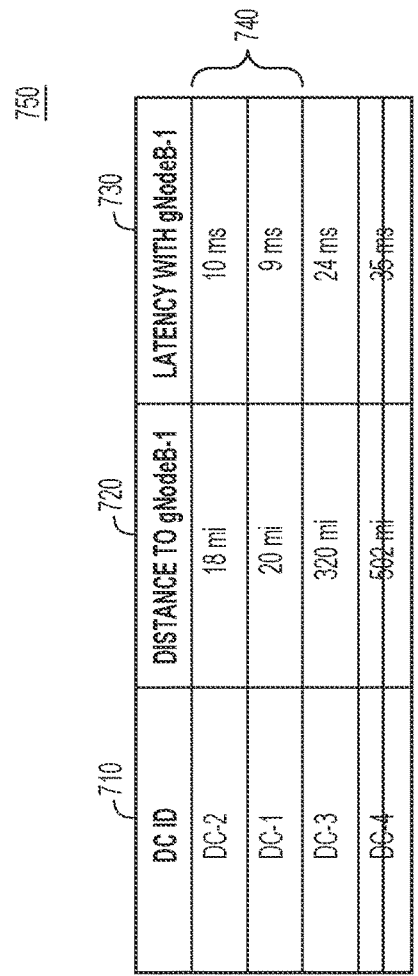

FIGS. 7A and 7B are tables of data center and gNodeB network data, according to an example embodiment. With reference to FIG. 7A, a table 700 is shown with DCs 710, distance values 720 (corresponding to distances between each DC and gNodeB), and latency values 730 (corresponding to latencies between each DC and gNodeB). In the embodiment depicted in FIGS. 7A and 7B, the latency criterion may stipulate that latencies can be no larger than 25 milliseconds (ms), and the distance criterion may stipulate that geographical distances between DCs and gNodeBs can be no larger than 500 miles.

Turning now to FIG. 7B, table 750 is generated by sorting each DC according to their distance to gNodeB-1. Next, any DCs that do not satisfy the distance and/or latency criteria are excluded from further consideration. In this example embodiment, DC-4 is excluded from further consideration (as indicated by strikethrough), as DC-4 does not satisfy either the distance criterion (less than 500 miles) or the latency criterion (less than 25 ms). However, in various embodiments, any DC can be excluded from consideration for violating either, or both, criteria. Next, a group of DCs is selected for gNodeB-1 based on their latency; as depicted, DC-1 and DC-2 are selected for DC group 740 due to having the lowest and next-lowest latencies. In some embodiments, DC-1 may serve as a primary DC by virtue of having the lowest latency overall, and DC-2 may serve as a secondary DC.

FIG. 8A is a block diagram depicting an environment 800 including data centers and hosted network functions, according to an example embodiment. As depicted, three DCs 801-803 are shown, along with network functions hosted by each DC. DC-1 801 includes MME-1, MME-3, AMF-1, AMF-2, UPF-1, and UPF-2; DC-2 802 includes MME-2, AMF-3, UPF-4, and UPF5; and DC-3 803 includes MME-5, AMF-4, UPF-5, and UPF-6. DC-1 801 and DC-2 802 form a pool that is assigned to gNodeB-1, and DC-1 801 and DC-3 803 form a pool that is assigned to gNodeB-2. It should be appreciated that, while in this embodiment, a DC (i.e., DC-1) is a member of multiple pools, in other embodiments, pool membership may be exclusive such that a same DC cannot be assigned to multiple pools.

With reference now to FIG. 8B is a table 804 of network function pools corresponding to the environment depicted in FIG. 8A, according to an example embodiment. As depicted, table 804 includes base station column 810, DC column 820, MME pool column 830, AMF pool column 840, and UPF pool column 850. Thus, table 804 indicates that gNodeB-1 is assigned to DC-1 and DC-2, whereas gNodeB-2 is assigned to DC-1 and DC-3. Accordingly, gNodeB-1 is connected to: a first MME pool that includes MME-1 and MME-3, and a second MME pool that includes MME-2; a first AMF pool that includes AMF-1 and AMF-2, and a second AMF pool that includes AMF-3; a first UPF pool that includes UPF-1 and UPF-2, and a second UPF pool that includes UPF-4and UPF-5. Likewise, gNodeB-2 is connected to: a first MME pool that includes MME-1; a second MME pool that includes MME-5; a first AMF pool that includes AMF-2, a second AMF pool that includes AMF-4; a first UPF pool that includes UPF-2, and a second UPF pool that includes UPF-5 and UPF-6.

Figure 9:
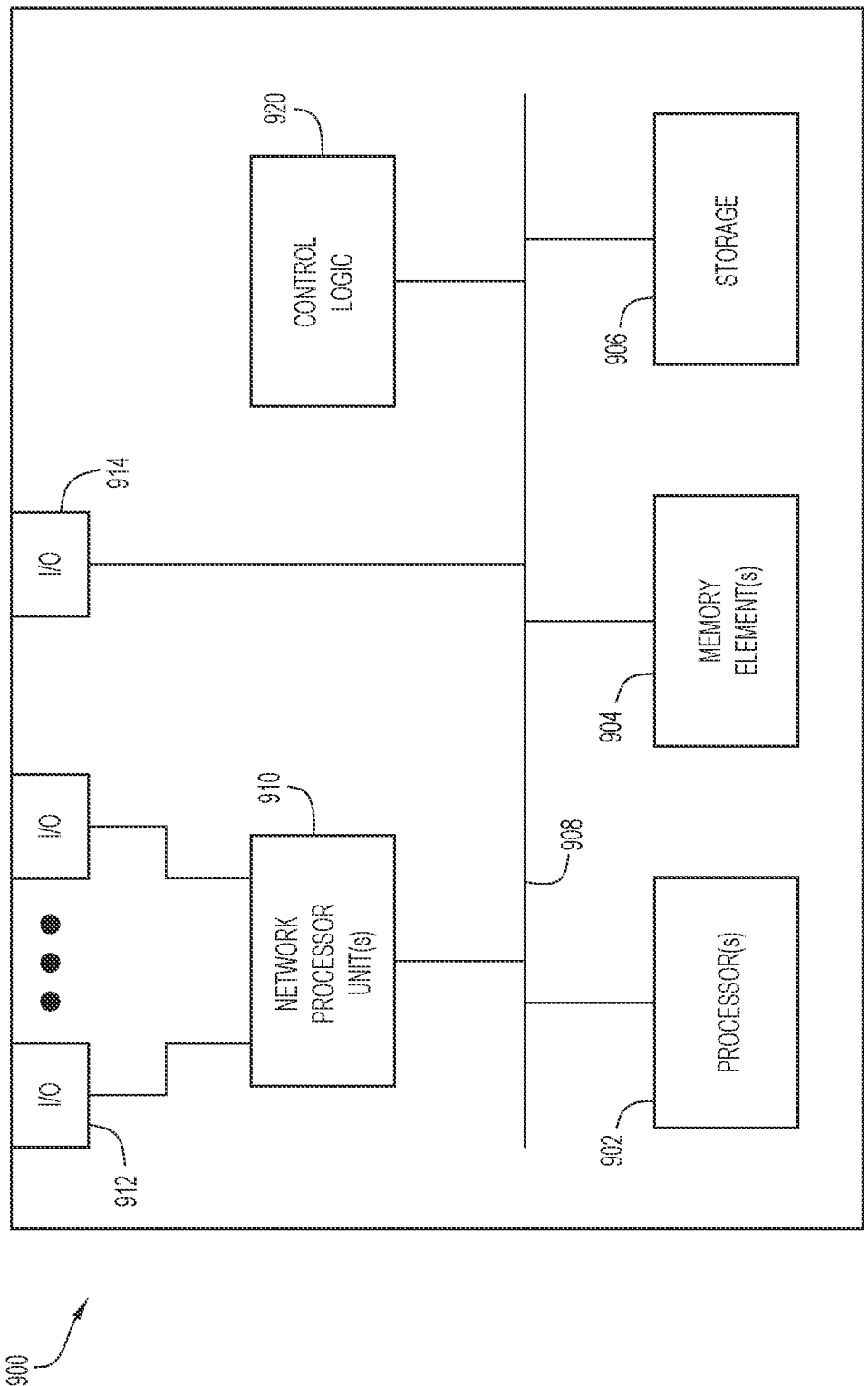
FIG. 9 is a block diagram of a device that may be configured to perform operations to connect radio base stations to data centers, as presented herein.

Referring now to FIG. 9. FIG. 9 illustrates a hardware block diagram of a computing device 900 that may perform functions associated with operations discussed herein in connection with the techniques depicted in FIGS. 1-8B. In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O 914, and 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with an architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O 914 allow for input and output of data and/or information with other entities that may be connected to computing device 900. For example, I/O 914 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 602.11 (e.g., Wi-Fi®/Wi-Fi6®), IEEE 602.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the '(s)' nomenclature (e.g., one or more element(s)).

In some aspects, the techniques described herein relate to a method including: obtaining mobile network configuration information identifying threshold latency criteria, threshold distance criteria, and network function operating criteria; obtaining data center information for each of a plurality of data centers; determining latencies between each of a plurality of radio base stations and each of the plurality of data centers; selecting a primary data center and a backup data center to interconnect with each radio base station based on a geographical distance between each data center and each radio base station satisfying the threshold distance criteria, and based on the determined latencies satisfying the threshold latency criteria; and generating network function pool configuration information for the primary data center and the backup data center; and configuring a domain name system (DNS) server and a network repository function (NRF) based on the network function pool configuration information.

In some aspects, the techniques described herein relate to a method, further including obtaining, for each radio base station of the plurality of radio base stations, inputs indicating a network address, geolocation coordinates, and tracking area code (TAC) information.

In some aspects, the techniques described herein relate to a method, further including obtaining inputs indicating the threshold distance criteria and the threshold latency criteria associated with the plurality of radio base stations.

In some aspects, the techniques described herein relate to a method, further including obtaining, for each data center of the plurality of data centers, inputs indicating a network address and geolocation information.

In some aspects, the techniques described herein relate to a method, wherein the selected primary data center and backup data center are selected by sorting the geographical distance of each data center to each radio base station and subsequently selecting the primary data center and the backup data center based on the latency of the data centers meeting the threshold latency criteria.

In some aspects, the techniques described herein relate to a method, wherein the selected primary data center and the backup data center are assigned to one or more radio base stations based on the one or more radio base stations being a highest number of radio base stations that commonly meet the threshold latency criteria and threshold distance criteria for the selected primary data center and the backup data center.

In some aspects, the techniques described herein relate to a method, wherein a remaining unassigned radio base station is assigned to the primary data center and the backup data center in response to determining that the remaining unassigned radio base station falls within a threshold standard deviation latency value between the remaining unassigned radio base station and the primary data center and the backup data center.

In some aspects, the techniques described herein relate to a method, further including creating one or more network function pools for each data center based on latency, wherein each network function pool is selected from a group of: a Mobility Management Entity pool, an Access and Mobility Management Function pool, and a User Plane Function pool.

In some aspects, the techniques described herein relate to a method, wherein Domain Name System records are generated for each entry in the one or more network function pools.

In some aspects, the techniques described herein relate to a method, wherein Mobility Management Entities of the Mobility Management entity pool or Access and Mobility Management Functions of the Access and Mobility Management Function pools are selected additionally based on criteria including available processing capacity and session capacity.

In some aspects, the techniques described herein relate to a method, further including facilitating interconnection of the selected primary data center and the backup data center with each radio base station of the plurality of radio base stations.

In some aspects, the techniques described herein relate to a system including: one or more computer processors; one or more computer readable storage media; and program instructions stored on the one or more computer readable storage media for execution by at least one of the one or more computer processors, the program instructions including instructions to: obtain mobile network configuration information identifying threshold latency criteria, threshold distance criteria, and network function operating criteria; obtain data center information for each of a plurality of data centers; determine latencies between each of a plurality of radio base stations and each of the plurality of data centers; select a primary data center and a backup data center to interconnect with each radio base station based on a geographical distance between each data center and each radio base station satisfying the threshold distance criteria, and based on the determined latencies satisfying the threshold latency criteria; and generate network function pool configuration information for the primary data center and the backup data center; and configure a domain name system (DNS) server and a network repository function (NRF) based on the network function pool configuration information.

In some aspects, the techniques described herein relate to a system, wherein the instructions further include instructions to obtain, for each radio base station of the plurality of radio base stations, inputs indicating a network address, geolocation coordinates, and tracking area code (TAC) information.

In some aspects, the techniques described herein relate to a system, wherein the instructions further include instructions to obtain inputs indicating the threshold distance criteria and the threshold latency criteria associated with the plurality of radio base stations.

In some aspects, the techniques described herein relate to a system, wherein the instructions further include instructions to obtain, for each data center of the plurality of data centers, inputs indicating a network address and geolocation information.

In some aspects, the techniques described herein relate to a system, wherein the selected primary data center and backup data center are selected by sorting the geographical distance of each data center to each radio base station and subsequently selecting the one or more data centers based on the latency of the data centers meeting the threshold latency criteria.

In some aspects, the techniques described herein relate to one or more non-transitory computer readable storage media having program instructions embodied therewith, the program instructions executable by a computer to cause the computer to perform operations including: obtain mobile network configuration information identifying threshold latency criteria, threshold distance criteria, and network function operating criteria; obtain data center information for each of a plurality of data centers; determine latencies between each of a plurality of radio base stations and each of the plurality of data centers; select a primary data center and a backup data center to interconnect with each radio base station based on a geographical distance between each data center and each radio base station satisfying the threshold distance criteria, and based on the determined latencies satisfying the threshold latency criteria; and generate network function pool configuration information for the primary data center and the backup data center; and configure a domain name system (DNS) server and a network repository function (NRF) based on the network function pool configuration information.

In some aspects, the techniques described herein relate to one or more non-transitory computer readable storage media, further including obtaining, for each radio base station of the plurality of radio base stations, inputs indicating a network address, geolocation coordinates, and tracking area code (TAC) information.

In some aspects, the techniques described herein relate to one or more non-transitory computer readable storage media, further including obtaining inputs indicating the threshold distance criteria and the threshold latency criteria associated with the plurality of radio base stations.

In some aspects, the techniques described herein relate to one or more non-transitory computer readable storage media, wherein the selected primary data center and backup data center are selected by sorting the distance of each data center to each radio base station and subsequently selecting the one or more data centers based on each data center's latency meeting the threshold latency criteria.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining mobile network configuration information identifying threshold latency criteria, threshold distance criteria, and network function operating criteria;
   obtaining data center information for each of a plurality of data centers;
   determining latencies between each of a plurality of radio base stations and each of the plurality of data centers;
   selecting a primary data center and a backup data center to interconnect with each radio base station based on a geographical distance between each data center and each radio base station satisfying the threshold distance criteria, and based on the determined latencies satisfying the threshold latency criteria;
   generating network function pool configuration information for the primary data center and the backup data center; and
   configuring a domain name system (DNS) server and a network repository function (NRF) based on the network function pool configuration information.

2. The method of claim 1, further comprising obtaining, for each radio base station of the plurality of radio base stations, inputs indicating a network address, geolocation coordinates, and tracking area code (TAC) information.

3. The method of claim 1, further comprising obtaining inputs indicating the threshold distance criteria and the threshold latency criteria associated with the plurality of radio base stations.

4. The method of claim 1, further comprising obtaining, for each data center of the plurality of data centers, inputs indicating a network address and geolocation information.

5. The method of claim 1, wherein the selected primary data center and backup data center are selected by sorting the geographical distance of each data center to each radio base station and subsequently selecting the primary data center and the backup data center based on the latency of the data centers meeting the threshold latency criteria.

6. The method of claim 5, wherein the selected primary data center and the backup data center are assigned to one or more radio base stations based on the one or more radio base stations being a highest number of radio base stations that commonly meet the threshold latency criteria and threshold distance criteria for the selected primary data center and the backup data center.

7. The method of claim 6, wherein a remaining unassigned radio base station is assigned to the primary data center and the backup data center in response to determining that the remaining unassigned radio base station falls within a threshold standard deviation latency value between the remaining unassigned radio base station and the primary data center and the backup data center.

8. The method of claim 1, further comprising creating one or more network function pools for each data center based on latency, wherein each network function pool is selected from a group of: a Mobility Management Entity pool, an Access and Mobility Management Function pool, and a User Plane Function pool.

9. The method of claim 8, wherein Domain Name System records are generated for each entry in the one or more network function pools.

10. The method of claim 8, wherein Mobility Management Entities of the Mobility Management entity pool or Access and Mobility Management Functions of the Access and Mobility Management Function pool are selected additionally based on criteria including available processing capacity and session capacity.

11. The method of claim 1, further comprising facilitating interconnection of the selected primary data center and the backup data center with each radio base station of the plurality of radio base stations.

12. A system comprising:
one or more computer processors;
one or more computer readable storage media; and
program instructions stored on the one or more computer readable storage media for execution by at least one of the one or more computer processors, the program instructions comprising instructions to:
obtain mobile network configuration information identifying threshold latency criteria, threshold distance criteria, and network function operating criteria;
obtain data center information for each of a plurality of data centers;
determine latencies between each of a plurality of radio base stations and each of the plurality of data centers;
select a primary data center and a backup data center to interconnect with each radio base station based on a geographical distance between each data center and each radio base station satisfying the threshold distance criteria, and based on the determined latencies satisfying the threshold latency criteria;
generate network function pool configuration information for the primary data center and the backup data center; and
configure a domain name system (DNS) server and a network repository function (NRF) based on the network function pool configuration information.

13. The system of claim 12, wherein the instructions further comprise instructions to obtain, for each radio base station of the plurality of radio base stations, inputs indicating a network address, geolocation coordinates, and tracking area code (TAC) information.

14. The system of claim 12, wherein the instructions further comprise instructions to obtain inputs indicating the threshold distance criteria and the threshold latency criteria associated with the plurality of radio base stations.

15. The system of claim 12, wherein the instructions further comprise instructions to obtain, for each data center of the plurality of data centers, inputs indicating a network address and geolocation information.

16. The system of claim 12, wherein the selected primary data center and backup data center are selected by sorting the geographical distance of each data center to each radio base station and subsequently selecting the one or more data centers based on the latency of the data centers meeting the threshold latency criteria.

17. One or more non-transitory computer readable storage media having program instructions embodied therewith, the program instructions executable by a computer to cause the computer to perform operations including:
obtain mobile network configuration information identifying threshold latency criteria, threshold distance criteria, and network function operating criteria;
obtain data center information for each of a plurality of data centers;
determine latencies between each of a plurality of radio base stations and each of the plurality of data centers;
select a primary data center and a backup data center to interconnect with each radio base station based on a geographical distance between each data center and each radio base station satisfying the threshold distance criteria, and based on the determined latencies satisfying the threshold latency criteria;
generate network function pool configuration information for the primary data center and the backup data center; and
configure a domain name system (DNS) server and a network repository function (NRF) based on the network function pool configuration information.

18. The one or more non-transitory computer readable storage media of claim 17, further comprising obtaining, for each radio base station of the plurality of radio base stations, inputs indicating a network address, geolocation coordinates, and tracking area code (TAC) information.

19. The one or more non-transitory computer readable storage media of claim 17, further comprising obtaining inputs indicating the threshold distance criteria and the threshold latency criteria associated with the plurality of radio base stations.

20. The one or more non-transitory computer readable storage media of claim 17, wherein the selected primary data center and backup data center are selected by sorting the geographical distance of each data center to each radio base station and subsequently selecting the one or more data centers based on the latency of the data centers meeting the threshold latency criteria.

* * * * *